US011971253B2

(12) United States Patent
Tanahashi et al.

(10) Patent No.: US 11,971,253 B2
(45) Date of Patent: Apr. 30, 2024

(54) MAGNET UNIT AND POSITION DETECTION DEVICE

(71) Applicant: Nippon Seiki Co., Ltd., Niigata (JP)

(72) Inventors: Masataka Tanahashi, Niigata (JP); Yuki Suyama, Niigata (JP); Yuki Kikui, Niigata (JP)

(73) Assignee: Nippon Seiki Co., Ltd., Niigata (JP)

(*) Notice: Subject to any disclaimer, the term of this patent is extended or adjusted under 35 U.S.C. 154(b) by 273 days.

(21) Appl. No.: 17/607,327

(22) PCT Filed: May 11, 2020

(86) PCT No.: PCT/JP2020/018796
§ 371 (c)(1),
(2) Date: Oct. 28, 2021

(87) PCT Pub. No.: WO2020/230752
PCT Pub. Date: Nov. 19, 2020

(65) Prior Publication Data
US 2022/0205772 A1 Jun. 30, 2022

(30) Foreign Application Priority Data
May 13, 2019 (JP) ................................. 2019-090960

(51) Int. Cl.
*G01B 7/00* (2006.01)
*G01D 5/12* (2006.01)
(52) U.S. Cl.
CPC ............... *G01B 7/003* (2013.01); *G01D 5/12* (2013.01)
(58) Field of Classification Search
CPC ........... G01B 7/003; G01D 5/12; G01D 5/145
(Continued)

(56) References Cited

U.S. PATENT DOCUMENTS 4,820,978 A    4/1989 Hirota
2007/0209438 A1* 9/2007 Branchereau .......... G01D 5/145
                                                73/514.39

FOREIGN PATENT DOCUMENTS

JP    S62-193563 U    12/1987
JP    2010-210287 A    9/2010
(Continued)

OTHER PUBLICATIONS

International Search Report issued in corresponding International Application No. PCT/JP2020/018796, dated Jul. 21, 2020 w/English Translation.

*Primary Examiner* — Farhana A Hoque
(74) *Attorney, Agent, or Firm* — Rimon P.C.

(57) ABSTRACT

The present invention provides a magnet unit and a position detection device that are excellent in thermal shock resistance without the risk of being damaged due to a temperature change and that are capable of detecting a position with high accuracy. A magnet unit comprises: a magnet that moves in a linear or rotating manner relative to a magnetic detection element (magnetic detection section) for detecting a change in a magnetic field; and a magnet holding member that moves in a linear or rotating manner while being fixed to an object L to be detected and that holds the magnet attached thereto. The magnet holding member has a fixed part that is fixed to the object L to be detected and a magnet housing part to which the magnet is attached. The magnet housing part has openings where opposite end surface portions of the magnet are exposed.

8 Claims, 7 Drawing Sheets

(58) Field of Classification Search
USPC .......................................................... 324/600
See application file for complete search history.

(56) References Cited

FOREIGN PATENT DOCUMENTS

| JP | 2017-026528 A | 2/2017 |
| JP | 2018-046660 A | 3/2018 |
| JP | 2018-119920 A | 8/2018 |

\* cited by examiner

MAGNET UNIT AND POSITION DETECTION DEVICE

CROSS REFERENCE TO RELATED APPLICATIONS

This application is the U.S. National Phase under 35 U. S. C. § 371 of International Application No. PCT/JP2020/018796, filed on May 11, 2020, which claims the benefit of Japanese Application No. 2019-090960, filed on May 13, 2019, the entire contents of each being incorporated by reference herein.

TECHNICAL FIELD

The present invention relates to a magnet unit and a position detection device.

BACKGROUND ART

A position detection device is used to detect a position of an object to be detected that moves linearly or rotatably. For example, a position detection device for rotational movement disclosed in Patent Document 1 is constituted of a magnet unit including a magnet and a magnet holding member which rotates with the magnet being mounted thereon, and a housing including a magnetic detection section that faces the magnet of the magnet unit, and detects a change in a magnetic field accompanied by rotational movement of the magnet. The magnet unit is formed by insert-molding the magnet in the magnet holding member made of resin, and is rotated by being connected to an object to be detected.

PRIOR ART DOCUMENT

Patent Document

Patent Document 1: Japanese Unexamined Patent Application Publication No. 2017-26528

SUMMARY OF THE INVENTION

Problems to be Solved by the Invention

In the position detection device disclosed in Patent Document 1, which detects a change in a magnetic field accompanied by movement of a magnet, when linear movement of an object to be detected is detected, it is necessary to mount a magnet unit along a linear moving direction of the object to be detected, and it is necessary to lengthen the magnet as a moving amount of linear movement increases. In a magnet unit, if a magnet insert-molded in a magnet holding member made of resin is lengthened, a linear expansion difference due to a temperature change between the magnet and a resin part may cause stress on the resin part, and a damage such as a crack may occur, which may lead to lowering of thermal shock resistance.

The present invention has been made in view of the above-described problem, and it is an object of the present invention to provide a magnet unit and a position detection device having excellent thermal shock resistance without the risk of occurrence of a damage due to a temperature change, and capable of detecting a position with accuracy.

Solution to Problem

In order to achieve the above-described object, a magnet unit according to a first aspect of the present invention is a magnet unit including a magnet that moves linearly or rotatably with respect to a magnetic detection section that detects a change in a magnetic field and a magnet holding member that moves linearly or rotatably while being fixed to an object to be detected, and to which the magnet is mounted. The magnet holding member includes a fixed part that is fixed to the object to be detected, and a magnet housing part to which the magnet is mounted. The magnet housing part has openings through which opposite end surface portions of the magnet in a longitudinal direction are exposed.

Further, a position detection device according to a second aspect of the present invention includes a magnet unit having a magnet that moves linearly or rotatably with respect to a magnetic detection section that detects a change in a magnetic field, and a magnet holding member that moves linearly or rotatably while being fixed to an object to be detected and to which the magnet is mounted; a magnetic detection portion having the magnetic detection section facing the magnet unit; and a case in which the magnetic detection portion is housed.

Effect of the Invention

The present invention enables to detect a position with accuracy without the risk of occurrence of a damage due to a temperature change, and with excellent thermal shock resistance.

BRIEF DESCRIPTION OF THE DRAWINGS

FIGS. 2A-2C show an embodiment of a magnet unit according to the present invention, wherein FIG. 2A is a schematic perspective view, FIG. 2B is a plan view, and FIG. 2C is a cross-sectional view taken along the line A-A in FIG. 2B.

FIGS. 3A-3C show another embodiment of the magnet unit according to the present invention, wherein FIG. 3A is a schematic perspective view, FIG. 3B is a plan view, and FIG. 3C is a cross-sectional view taken along the line A-A in FIG. 3B.

FIGS. 4A-4C show an embodiment of a magnet unit according to the present invention, wherein FIG. 4A is a schematic perspective view, FIG. 4B is a plan view, and FIG. 4C is a cross-sectional view taken along the line A-A in FIG. 4B.

FIGS. 5A-5C show another embodiment of the magnet unit according to the present invention, wherein FIG. 5A is a schematic perspective view, FIG. 5B is a plan view, and FIG. 5C is a cross-sectional view taken along the line A-A in FIG. 5B.

FIGS. 6A-6C show an embodiment of the magnet unit according to the present invention, wherein FIG. 6A is a schematic perspective view, FIG. 6B is a plan view, and FIG. 6C is a cross-sectional view taken along the line A-A in FIG. 6B.

MODE FOR CARRYING OUT THE INVENTION

In the following, a magnet unit and a position detection device according to an embodiment of the present invention are described with reference to the accompanying drawings.

In the following description, it is assumed that a front-rear direction is an X direction, a left-right direction is a Y direction, and an up-down direction is a Z direction with respect to a state of a position detection device 1 shown in FIG. 1 as a reference. In addition, description is made based on a premise that directions in which arrows indicating the X direction, the Y direction, and the Z direction are directed are a + (plus) direction and a direction opposite thereto is a − (minus) direction.

Figure 1:
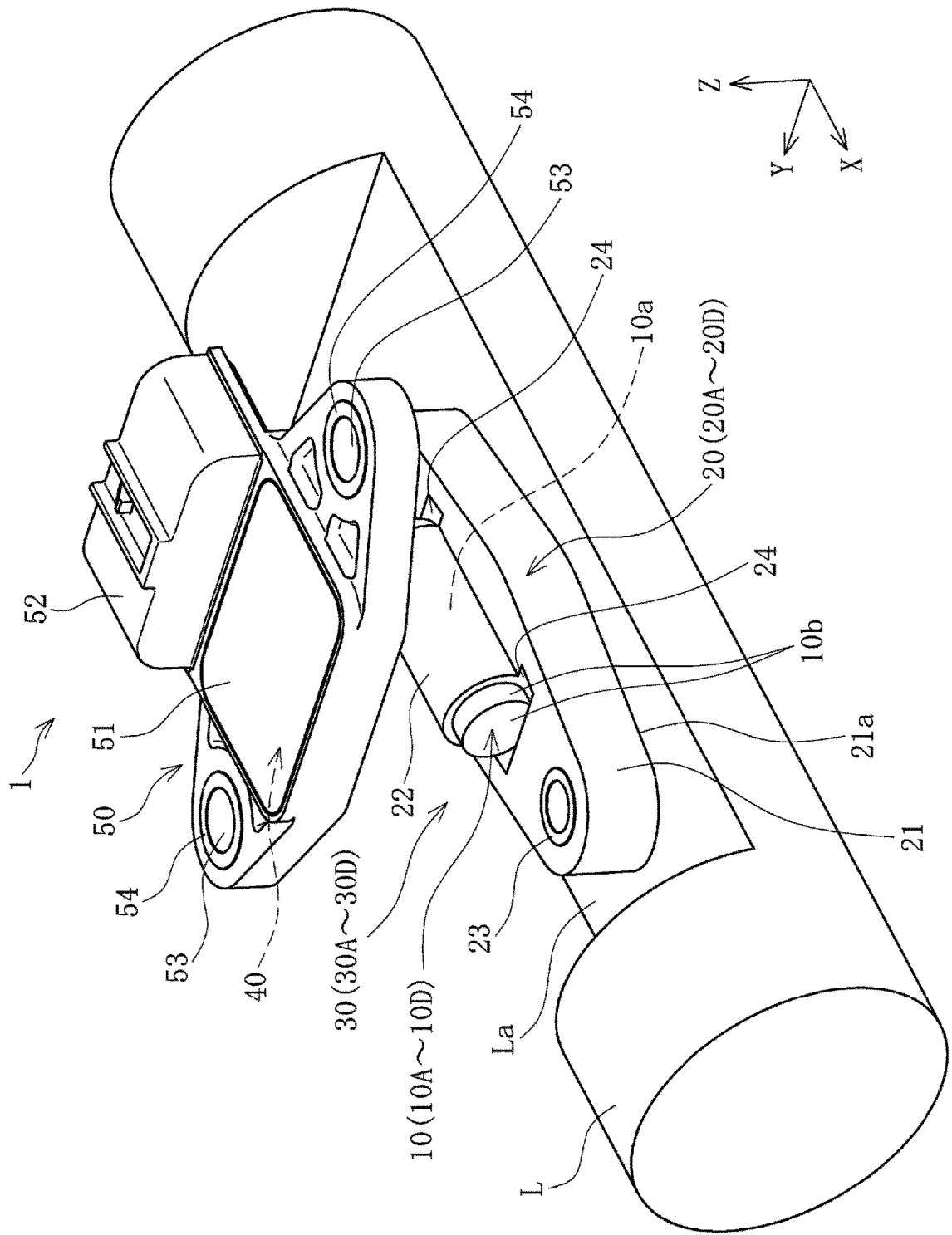
FIG. 1 is a schematic perspective view of an embodiment of a position detection device according to the present invention.
Figure 2A:
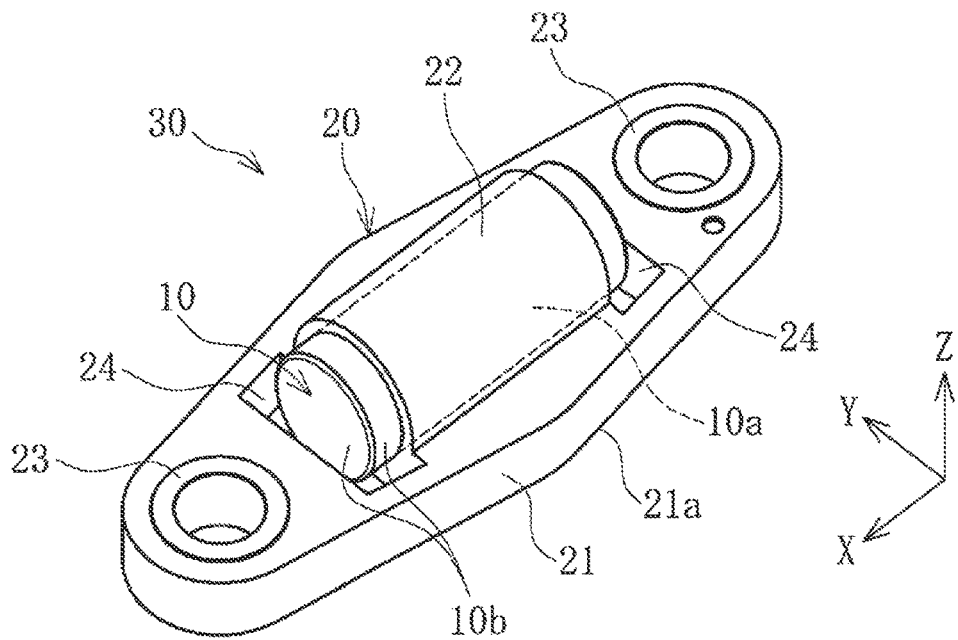
Figure 2B:
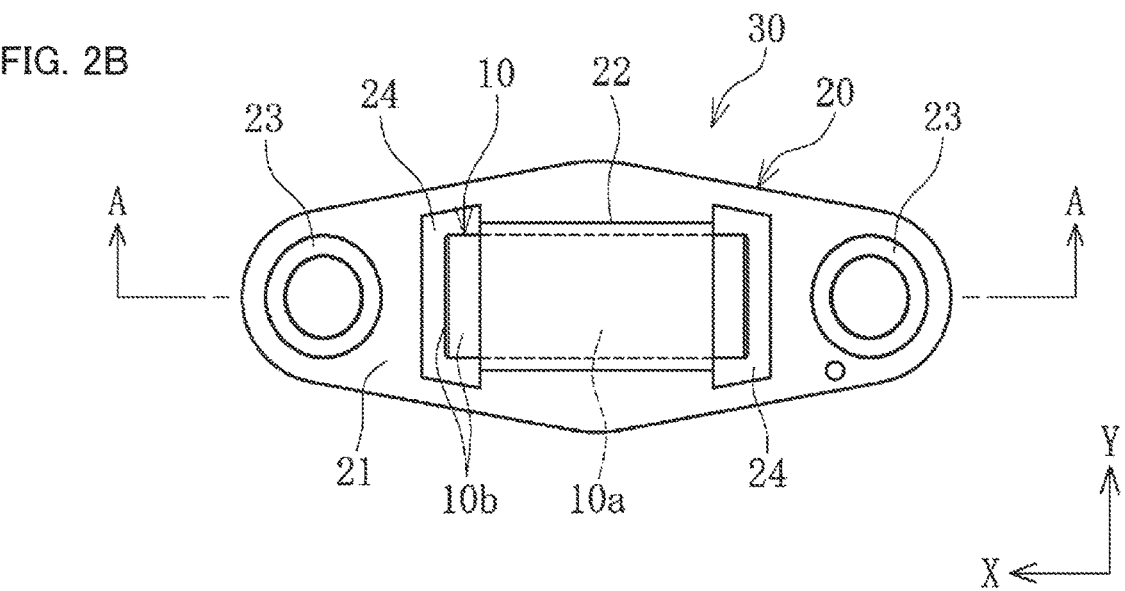
Figure 2C:
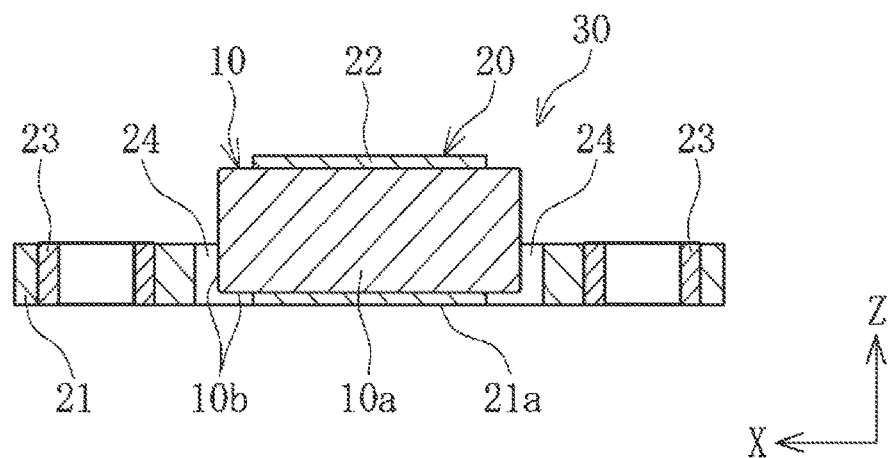
Figure 7:
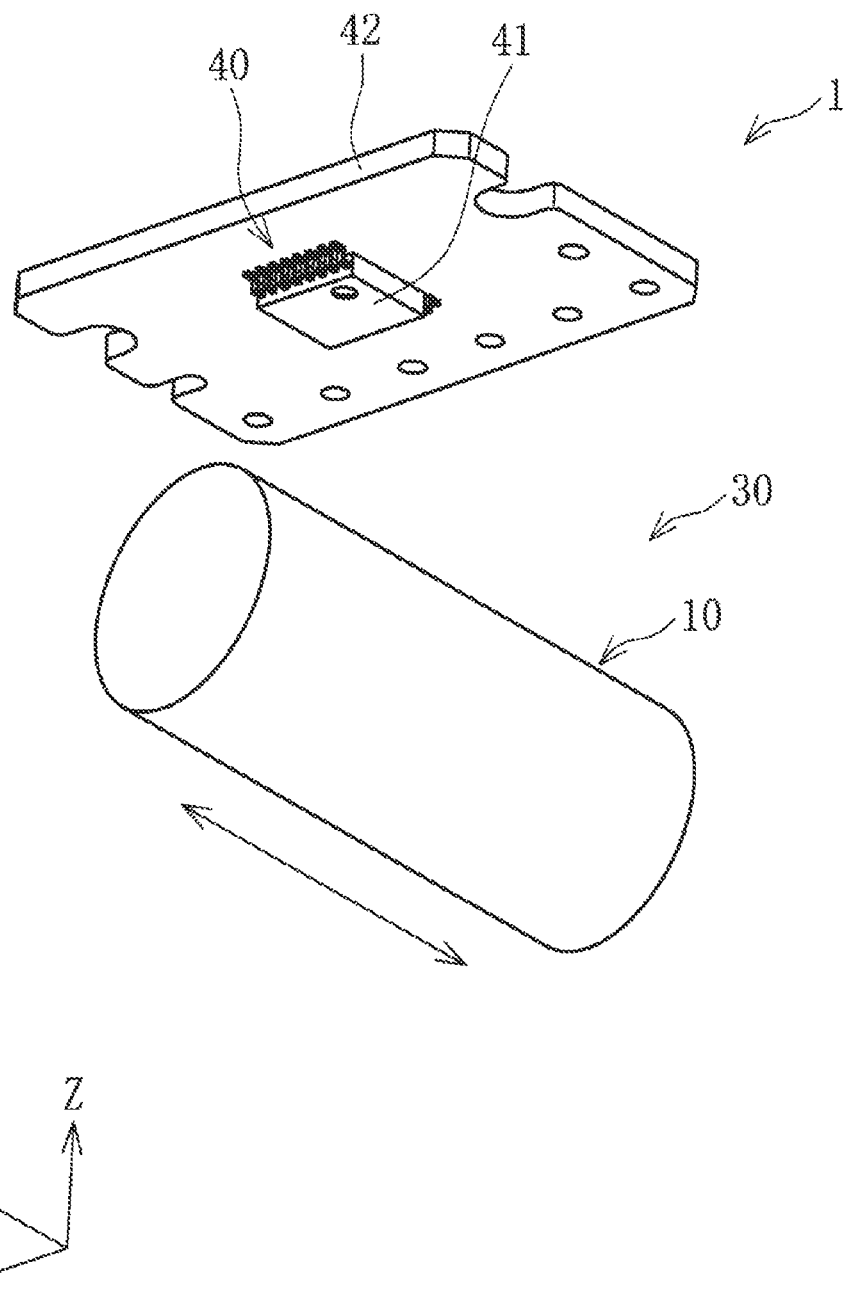
FIG. 7 is a schematic perspective view of a magnetic detection portion according to an embodiment of the present invention.

As shown in FIGS. 1, 2, and 7, the position detection device 1 includes a magnet unit 30 having a magnet 10 and a magnet holding member 20, a magnetic detection portion 40 having a magnetic detection section 41, and a case 50.

The position detection device 1 according to the present embodiment is used, for example, for detecting a select position (a position that linearly moves in the ±X direction) of an operation lever of an automatic transmission of an automobile.

The magnet unit 30 is fixed to an operation lever, which is an object L to be detected, and is configured in such a way as to avoid a damage of the magnet unit 30 due to a temperature change or the like, even when a moving amount of the object L to be detected is large, and the long magnet 10 is used. Also, the position detection device 1 can detect a position (position in the X direction) with accuracy by detecting a change in a magnetic field accompanied by relative movement of the magnet unit 30. In addition, both of the magnet unit 30 and the position detection device 1 have excellent thermal shock resistance.

The magnet unit 30 is constituted of the magnet 10 and the magnet holding member 20.

The magnet 10 is constituted of, for example, a samarium-cobalt magnet (SmCo), and is formed into a desired shape, such as a substantially cylindrical shape, for example, by compression molding and sintering powder materials. The magnet 10 is magnetized in such a way that two magnetic poles are aligned, for example, in a direction (longitudinal direction, X direction) along a central axis of a cylindrical shape.

The magnet 10 is linearly moved with respect to the magnetic detection section 41 that detects a change in a magnetic field. The magnet 10 is mounted on the magnet holding member 20, and is formed into the magnet unit 30. The magnet 10 is linearly moved along the central axis direction (X direction) of the cylindrical shape by fixing the magnet unit 30 to the object L to be detected.

Magnetization of the magnet 10 is performed, for example, after the magnet 10 in an unmagnetized state is mounted on the resin magnet holding member 20 to be described later by insert-molding. This enables forming the magnet unit 30 that is magnetized as the magnet 10 in a fixed state at a predetermined position of the magnet holding member 20.

A change in a magnetic field accompanied by linear movement of the magnet 10 is detected by the magnetic detection portion 40 including the magnetic detection section 41 that is housed in the case 50 to be described later and faces the magnet 10.

The magnet holding member 20 includes a fixed part 21 fixed to the object L to be detected, and a magnet housing part 22 in which the magnet 10 is housed and to which the magnet 10 is mounted. For example, the magnet holding member 20 is formed of thermoplastic resin such as poly-butylene terephthalate. As shown in FIGS. 1 and 2, the fixed part 21 of the magnet holding member 20 is formed into a substantially rhombus shape in a plan view with a long side in the X-direction and a short side in the Y-direction, with both ends in the X-direction being formed into an arc shape, and is formed into a plate shape in which a bottom surface portion (a bottom surface portion in the −Z direction) 21*a* is flat. In the fixed part 21, a metal collar 23 for reinforcement is embedded and mounted at both ends in the X direction by insert-molding. The fixed part 21 is fixed by inserting bolts or the like into the collars 23 of the fixed part 21 and abutment against a cutout portion La of the object L to be detected.

The magnet holding member 20 includes the magnet housing part 22 on the flat bottom surface portion 21*a* at a central portion of the fixed part 21. In the magnet holding member 20, the cylindrical magnet 10 is mounted in such a way that the central axis is aligned along the moving direction (X direction) of the object L to be detected. In the magnet holding member 20, a plate thickness of the fixed part 21 is formed to be smaller than the diameter of the magnet 10, the magnet 10 housed in the magnet housing part 22 is housed to protrude upwardly (in the Z direction) from the fixed part 21, and an outer portion 10*a* of the magnet 10 is mounted by being covered with resin.

In the magnet unit 30 constituted of the magnet 10 and the magnet holding member 20, the magnet 10 is made of metal, whereas the magnet housing part 22 of the magnet holding member 20 is made of resin. Therefore, if the magnet 10 is completely covered with resin of the magnet housing part 22, a thermal expansion difference occurs in response to a temperature change, and in particular, an effect of the thermal expansion difference on the magnet 10 in a longitudinal direction, and thermal shock resistance become problems.

In view of the above, in the magnet unit 30, an opening 24 is formed in the magnet housing part 22 of the magnet holding member 20 to expose opposite end surface portions 10*b* of the magnet 10 in the longitudinal direction (X direction). As shown in FIG. 2, the opening 24 is formed through the magnet holding member 20 in the Z direction, and is formed in such a way to achieve a state that the end surface portion (an end surface, and a part of the outer portion 10*a* adjacent to the end surface) 10*b* of the magnet 10 is exposed (a state in which the magnet 10 is not covered with resin). Thus, the outer portion 10*a* excluding the end surface portion 10*b* of the magnet 10 is covered with resin of the magnet housing part 22, and is formed integrally with the fixed part 21, whereby the magnet unit 30 constituted of the magnet 10 and the magnet holding member 20 is formed.

The magnet unit 30 is fixed by insert-molding the magnet 10 and the collar 23 in the magnet housing part 22 of the magnet holding member 20. Specifically, the magnet unit 30 in which the magnet 10 is fixed to the magnet housing part 22 of the magnet holding member 20 is obtained by pouring a resin material into a die in a state that the magnet 10 is placed in the die and held by a holding pin or the like, and curing the resin material.

In the magnet unit 30 as described above, the opening 24 can be formed in the magnet housing part 22 of the magnet holding member 20 to expose the end surface portion 10*b* of the magnet 10 without being covered with resin. This prevents stress from acting on resin of the magnet housing part 22 via the magnet 10, even when a thermal expansion difference due to a temperature change or the like occurs between the magnet housing part 22 and the magnet 10, thereby preventing occurrence of a crack or a damage, and providing excellent thermal shock resistance. In particular, even when a moving amount of the object L to be detected is large, and the magnet 10 needs to be lengthened in the central axis direction (X direction), it is possible to release the thermal expansion difference, and prevent occurrence of a crack or a damage due to thermal shock of the magnet holding member 20 by the magnet 10.

Next, other embodiments of the magnet unit are described with reference to the drawings.

Figure 3A:
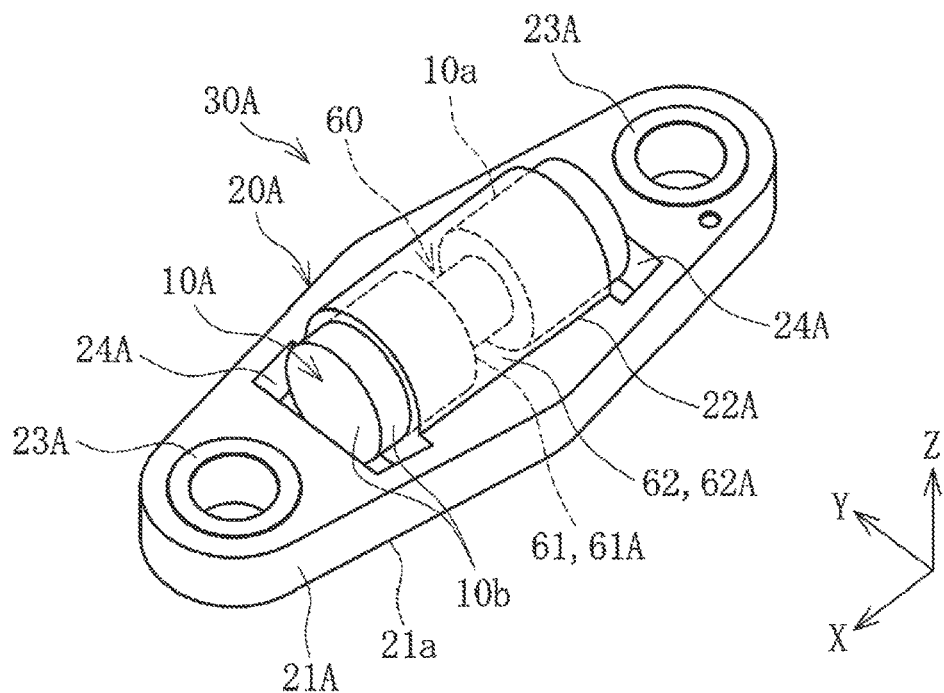
Figure 3B:
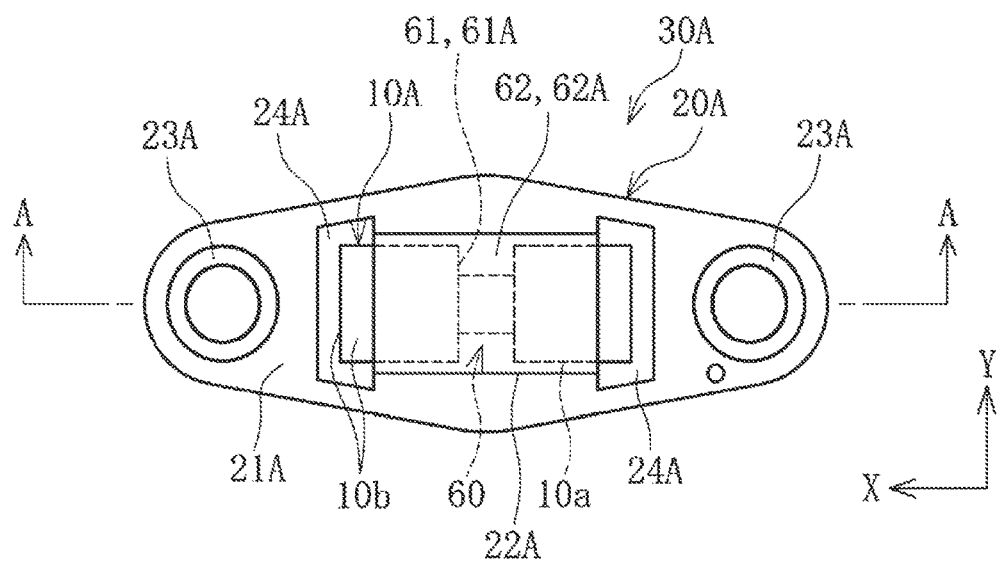
Figure 3C:
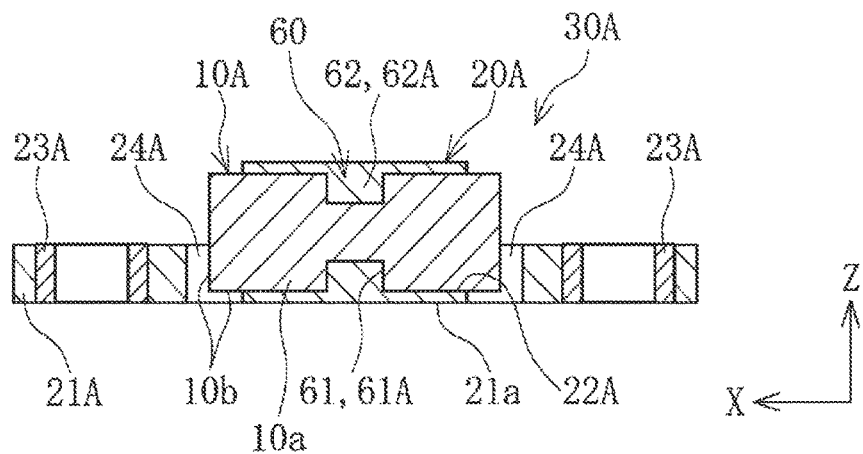

As shown in FIG. 3, a magnet unit 30A is the one in which a position of a magnet 10A is regulated with respect to a magnet holding member 20A, and the magnet 10A is mounted thereto. The magnet unit 30A includes a positioning portion 60 formed by fitting and positioning a concave portion 61 and a convex portion 62 with each other between an outer portion 10a of the magnet 10A and a magnet housing part 22A of the magnet holding member 20A. The positioning portion 60 is such that, for example, the concave portion 61 is formed in the magnet 10A, and the convex portion 62 that fits into the concave portion 61 is formed on the magnet holding member 20A, whereby the magnet unit 30A is formed. Thus, the magnet 10A can be formed into the magnet unit 30A whose position in the longitudinal direction (X direction) is regulated by the positioning portion 60. Note that, the positioning portion 60 may have the concave portion 61 and the convex portion 62 on opposite sides for fitting with each other.

In the positioning portion 60, for example, the concave portion 61 is disposed at a central portion of the magnet 10A in the longitudinal direction, and the convex portion 62 is disposed at a central portion of the magnet housing part 22A of the magnet holding member 20A in the longitudinal direction in association with the concave portion 61. The positioning portion 60 may be formed at a plurality of positions, not to mention a case where the positioning portion 60 is formed at one position on a central portion in the longitudinal direction. In this case, forming a plurality of positioning portions 60 near the central portion enables releasing an effect of thermal expansion and the like toward an end surface portion 10b, which is preferable. The magnet holding member 20A has a fixed part 21A, and a collar 23A is embedded in both ends.

In the magnet unit 30A, the concave portion 61 at a central portion of the magnet 10A is formed as an annular concave portion 61A recessed into an annular shape on a circumference of the outer portion 10a. The convex portion 62 of the magnet holding member 20A is formed as an annular convex portion 62A of an annular shape protruding from an inner peripheral surface of the magnet housing part 22A. Thus, a position of the magnet 10A in the longitudinal direction (X direction) is regulated, and the magnet 10A is positioned by fitting, into the annular concave portion 61A of the magnet 10A, the annular convex portion 62A of an annular shape protruding from the inner peripheral surface of the magnet housing part 22A of the magnet holding member 20A. In the magnet unit 30A, a size of the annular concave portion 61A and the annular convex portion 62A of the positioning portion 60, specifically, a width (dimension in the X direction) and a depth (dimension in the Z direction) may be set to any value, as far as it is possible to position the magnet 10A in the magnet housing part 22A in the longitudinal direction. It is preferable to form a uniform magnetic field as much as possible, while suppressing an effect of the magnet 10A on a magnetic field. Also, after the magnet 10A is magnetized, an effect on a detected position due to a change in a magnetic field for forming the positioning portion 60 is adjusted by performing calibration.

In the magnet unit 30A as described above, the concave portion 61 or the convex portion 62 is formed in advance on the magnet 10A. Thereafter, the magnet 10A and the collar 23A are insert-molded and fixed in the magnet housing part 22A of the magnet holding member 20A. Specifically, the magnet 10A is fixed to the magnet housing part 22A of the magnet holding member 20A by the annular concave portion 61A and the annular convex portion 62A of the positioning portion 60 by pouring a resin material into a die in a state that the magnet 10A is placed in the die and held by a holding pin or the like, and curing the resin material. Thereafter, the magnet 10A is magnetized, and the magnet unit 30A is obtained.

In the magnet unit 30A as described above, when a thermal expansion difference due to a temperature change or the like occurs between the magnet 10A and the magnet housing part 22A, since positions of central portions of the magnet 10A and the magnet housing part 22A are regulated by the positioning portion 60, the magnet 10A expands from the central portion toward an end surface portion 10b outwardly in the longitudinal direction (X direction). However, an opening 24A suppresses stress from being applied to the magnet housing part 22A, and prevents occurrence of a crack and a damage, thereby providing excellent thermal shock resistance.

Note that, in place of the annular concave portion 61A and the annular convex portion 62A, a part of an annular portion may be formed into a concave portion 61, and a part of an annular portion may be formed into a convex portion 62. In this case, it is preferable to form an opposite side (in the illustrated example, +Z direction side) of the magnet unit 30A facing the magnetic detection portion 40 of the magnetic detection section 41 into a uniform surface where the concave portion 61 and the convex portion 62 are not formed. This enables forming a magnetic field by the magnet 10A of the magnet unit 30A uniformly on the opposite side. Also, by forming a part of an annular portion into the concave portion 61 and the convex portion 62, the magnet 10A can be positioned by abutment of the concave portion 61 and the convex portion 62 at opposite end surfaces of an arc shape, and positioning can be performed not only in the longitudinal direction (X direction) but also in the rotational direction around an axis (rotational direction around the X axis) extending in the longitudinal direction. The length (arc length) of a part of an annular portion of the concave portion 61 and the convex portion 62 may be set to any value, as far as it is possible to position the magnet 10A in the magnet housing part 22A.

Figure 4A:
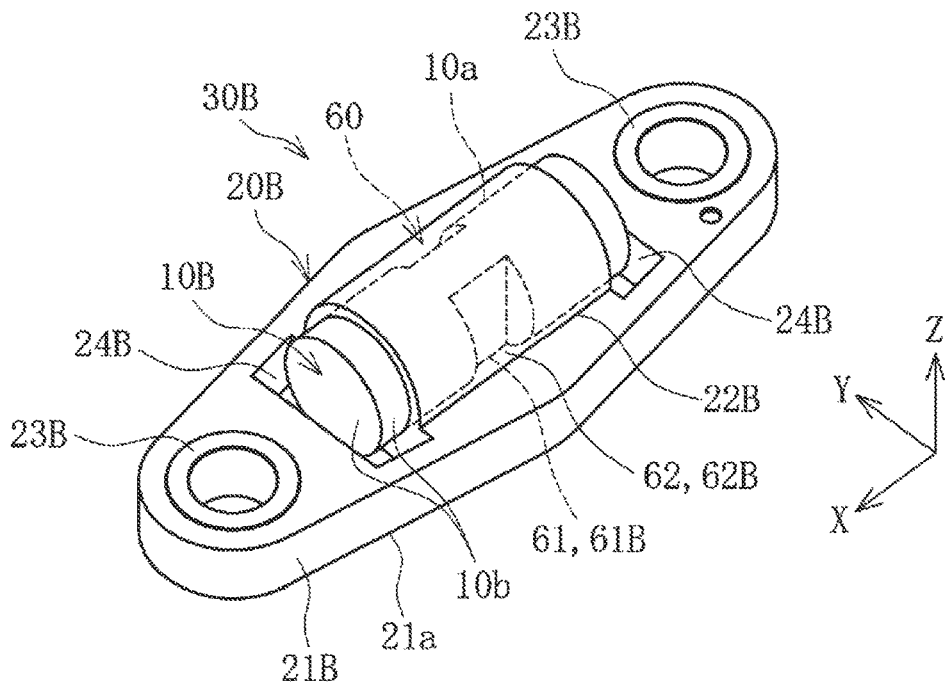
Figure 4B:
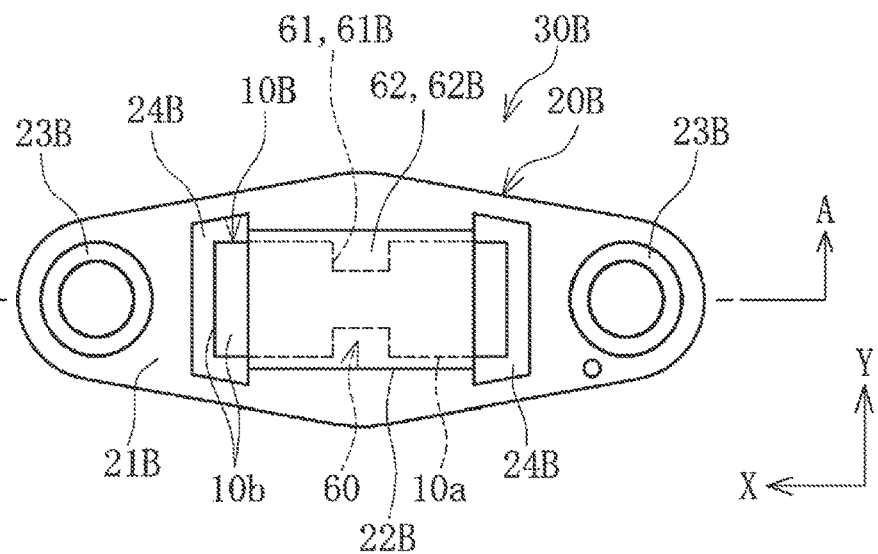
Figure 4C:
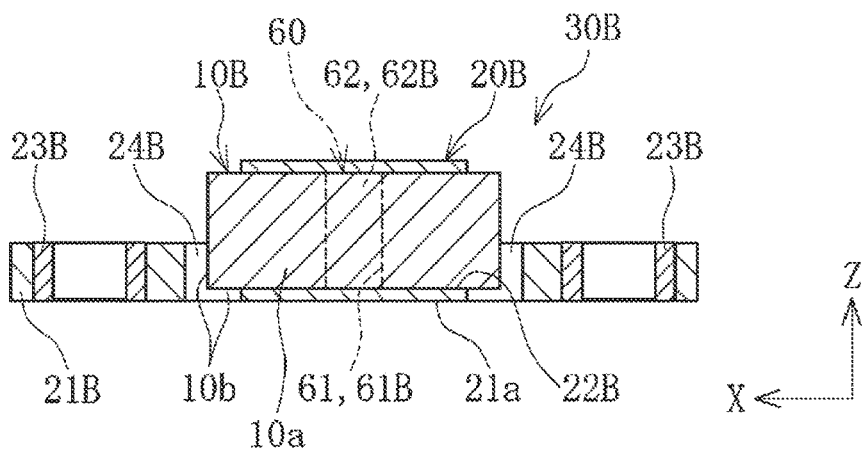

Next, the magnet unit 30B is described with reference to FIG. 4.

The magnet unit 30B differs in the configuration of a positioning portion 60 that regulates a position of a magnet 10B with respect to a magnet holding member 20B and mounts the magnet 10B thereto. The magnet unit 30B includes the positioning portion 60 formed by fitting and positioning a concave portion 61 and a convex portion 62 with each other between an outer portion 10a of the magnet 10B and a magnet housing part 22B of the magnet holding member 20B. In the positioning portion 60, the concave portion 61 is formed in the magnet 10B, and the convex portion 62 that fits into the concave portion 61 is formed on the magnet holding member 20B, whereby the magnet unit 30B is formed. Note that, in the positioning portion 60, the concave portion 61 and the convex portion 62 may be formed on opposite sides for fitting with each other.

In the positioning portion 60, for example, the concave portion 61 is disposed at a central portion of the magnet 10B in the longitudinal direction, and the convex portion 62 is disposed at a central portion of the magnet housing part 22B of the magnet holding member 20B in the longitudinal direction in association with the concave portion 61. The magnet holding member 20B has a fixed part 21B, and a collar 23B is embedded in both ends.

In the magnet unit 30B, the concave portion 61 at a central portion of the magnet 10B is formed as a D-shaped concave portion 61B which serves as a first planar portion cut out in parallel on both sides of the outer portion 10a with respect to a central axis. The convex portion 62 of the magnet holding member 20B is formed as a D-shaped convex portion 62B which serves as a second planar portion protruding in parallel from both sides of an inner peripheral surface of the magnet housing part 22B. Thus, in addition to regulation of a position of the magnet 10B in the Y-direction and the Z-direction by the outer portion 10a, by regulating rotation of the magnet 10B around the central axis (around the X-axis), it is possible to detect a position of the magnet 10B with high accuracy while suppressing rotation of the magnet 10B around the central axis. In addition, by fitting, into the D-shaped concave portion 61B of the magnet 10B, the D-shaped convex portion 62B protruding from the inner peripheral surface of the magnet housing part 22B of the magnet holding member 20B, it is possible to regulate a position of the magnet 10B in the longitudinal direction (X direction), and perform positioning. In addition to the above, in the magnet unit 30B, it is also possible to regulate a position in a direction intersecting a direction along the plane of the D-shaped concave portion 61B and the D-shaped convex portion 62B (e.g., a direction orthogonal to the plane).

Specifically, in a case where the first planar portion of the D-shaped concave portion 61B is formed in such a way as to be in parallel to the Z direction while facing in the left-right direction, it is possible to regulate a position of the magnet 10B, and the magnet housing part 22B of the magnet holding member 20B in the Y direction. Likewise, in a case where the D-shaped concave portion 61B is formed in parallel to the Y direction, while facing in the up-down direction, it is possible to regulate a position in the Z direction. Furthermore, it is possible to regulate rotation of the magnet 10B around the central axis (around the X-axis), and it is possible to detect a position of the magnet 10B with high accuracy while suppressing rotation of the magnet 10B around the central axis.

In the magnet unit 30B, a size, i.e., a width (dimension in the X-direction), and a depth from the outer portion 10a to the planar portion, of the D-shaped concave portion 61B and the D-shaped convex portion 62B of the positioning portion 60 may be set to any value, as far as it is possible to position the magnet 10B in the magnet housing part 22B. It is preferable to form a uniform magnetic field as much as possible while suppressing an effect of the magnet 10B on a magnetic field. Also, after the magnet 10B is magnetized, an effect on a detected position due to a change in a magnetic field for forming the positioning portion 60 is adjusted by performing calibration.

In the magnet unit 30B as described above, the concave portion 61 or the convex portion 62 is formed in advance on the magnet 10B. Thereafter, the magnet 10B and the collar 23B are insert-molded and fixed in the magnet housing part 22B of the magnet holding member 20B. Specifically, the magnet 10B is fixed to the magnet housing part 22B of the magnet holding member 20B by the D-shaped concave portion 61B and the D-shaped convex portion 62B of the positioning portion 60 by pouring a resin material into a die in a state that the magnet 10B is placed in the die and held by a holding pin or the like, and curing the resin material. Thereafter, the magnet 10B is magnetized, and the magnet unit 30B is obtained.

In the magnet unit 30B as described above, when a thermal expansion difference due to a temperature change or the like occurs between the magnet 10B and the magnet housing part 22B, since positions of central portions of the magnet 10B and the magnet housing part 22B are regulated by the positioning portion 60, the magnet 10B expands from the central portion of the magnet 10B toward an end surface portion 10b outwardly in the longitudinal direction (X direction). However, an opening 24B suppresses stress from being applied to the magnet housing part 22B, and prevents occurrence of a crack and a damage, thereby providing excellent thermal shock resistance. Also, by forming the positioning portion 60 by the D-shaped concave portion 61B and the D-shaped convex portion 62B, it is possible to position the magnet unit 30B not only in the longitudinal direction (X direction) but also in the rotational direction around an axis (rotational direction around the X axis) extending in the longitudinal direction.

Note that, in place of forming the D-shaped concave portion 61B and the D-shaped convex portion 62B in parallel on both sides, the D-shaped concave portion 61B and the D-shaped convex portion 62B may be formed on only one side. In this case, it is preferable to form an opposite side (+Z direction side) of the magnet unit 30B facing the magnetic detection portion 40 of the magnetic detection section 41 into a uniform surface, and form the D-shaped concave portion 61B and the D-shaped convex portion 62B on a lower side (−Z direction side). This enables forming a magnetic field uniformly on the opposite side by the magnet 10B of the magnet unit 30B.

Next, a magnet unit 30C is described with reference to FIG. 5.

The magnet unit 30C differs in the configuration of a positioning portion 60 that regulates a position of a magnet 10C with respect to a magnet holding member 20C and mounts the magnet 10C thereto. The magnet unit 30C includes the positioning portion 60 formed by fitting and positioning a concave portion 61 and a convex portion 62 with each other between an outer portion 10a of the magnet 10C and a magnet housing part 22C of the magnet holding member 20C. In the positioning portion 60, the concave portion 61 is formed in the magnet 10C, and the convex portion 62 that fits into the concave portion 61 is formed on the magnet holding member 20C, whereby the magnet unit 30C is formed. Note that, in the positioning portion 60, the concave portion 61 and the convex portion 62 may be formed on opposite sides for fitting with each other. In the positioning portion 60, for example, the concave portion 61 is disposed at a central portion of the magnet 10C in the longitudinal direction, and the convex portion 62 is disposed at a central portion of the magnet housing part 22C of the magnet holding member 20C in the longitudinal direction in association with the concave portion 61. The magnet holding member 20C has a fixed part 21C, and a collar 23C is embedded in both ends.

In the magnet unit 30C, the concave portion 61 at a central portion of the magnet 10C is formed in the left-right direction (Y-direction) as, for example, a cylindrical columnar concave portion 61C passing through the magnet 10C radially from the outer portion 10a. The convex portion 62 of the magnet holding member 20C is formed in the left-right direction (Y-direction) as, for example, a cylindrical columnar convex portion 62C protruding from an inner peripheral surface of the magnet housing part 22C. Thus, a position of the magnet 10C in the longitudinal direction (X direction) is regulated, and the magnet 10C is positioned by fitting, into the cylindrical columnar concave portion 61C having a cylindrical through-hole of the magnet 10C, the cylindrical columnar convex portion 62C protruding from the inner peripheral surface of the magnet housing part 22C of the magnet holding member 20C. It is also possible to regulate a position of the magnet unit 30C in a direction other than the central axis direction of columns of the columnar concave portion 61C and the columnar convex portion 62C. For example, it is possible to regulate a position in a direction (direction other than the central axis direction) intersecting the central axis direction of the columnar concave portion 61C.

In the magnet unit 30C, a size of the columnar concave portion 61C and the columnar convex portion 62C of the positioning portion 60, specifically, diameters of the columns, may be set to any value, as far as it is possible to position the magnet 10C in the magnet housing part 22C. It is preferable to form a uniform magnetic field as much as possible while suppressing an effect of the magnet 10C on a magnetic field. It is preferable that the positioning portion 60 is not exposed from an upper surface of the magnet 10C (surface facing the magnetic detection portion 40). Also, after the magnet 10C is magnetized, an effect on a detected position due to a change in a magnetic field for forming the positioning portion 60 is adjusted by performing calibration.

In the magnet unit 30C as described above, the concave portion 61 or the convex portion 62 is formed in advance on the magnet 10C. Thereafter, the magnet 10C and the collar 23C are insert-molded and fixed in the magnet housing part 22C of the magnet holding member 20C. Specifically, the magnet 10C is fixed to the magnet housing part 22C of the magnet holding member 20C by the columnar concave portion 61C and the columnar convex portion 62C of the positioning portion 60 by pouring a resin material into a die in a state that the magnet 10C is placed in the die and held by a holding pin or the like, and curing the resin material. Thereafter, the magnet 10C is magnetized, and the magnet unit 30C is obtained.

In the magnet unit 30C as described above, when a thermal expansion difference due to a temperature change or the like occurs between the magnet 10C and the magnet housing part 22C, since positions of central portions of the magnet 10C and the magnet housing part 22C are regulated by the positioning portion 60, the magnet 10C expands from the center portion of the magnet 10C toward an end surface portion 10b outwardly in the longitudinal direction (X direction). However, an opening 24C prevents stress from being applied to the magnet housing part 22C, and prevents occurrence of a crack and a damage, thereby providing excellent thermal shock resistance. Also, by forming the positioning portion 60 by the columnar concave portion 61C and the columnar convex portion 62C, it is possible to position the magnet 10C not only at a position in the longitudinal direction (X direction) but also at a position in a direction other than the central axis direction of columns of the columnar concave portion 61C and the columnar convex portion 62C.

The columnar concave portion 61C and the columnar convex portion 62C may be formed at a plurality of positions, in place of being formed at one position. Also, the columnar concave portion 61C and the columnar convex portion 62C may be formed at one or more positions without passing through the magnet 10C. In this case, it is preferable to form an opposite side (+Z direction side) of the magnet unit 30C facing the magnetic detection portion 40 of the magnetic detection section 41 into a uniform surface. This enables forming a magnetic field by the magnet 10C of the magnet unit 30C uniformly on the opposite side.

Figure 6A:
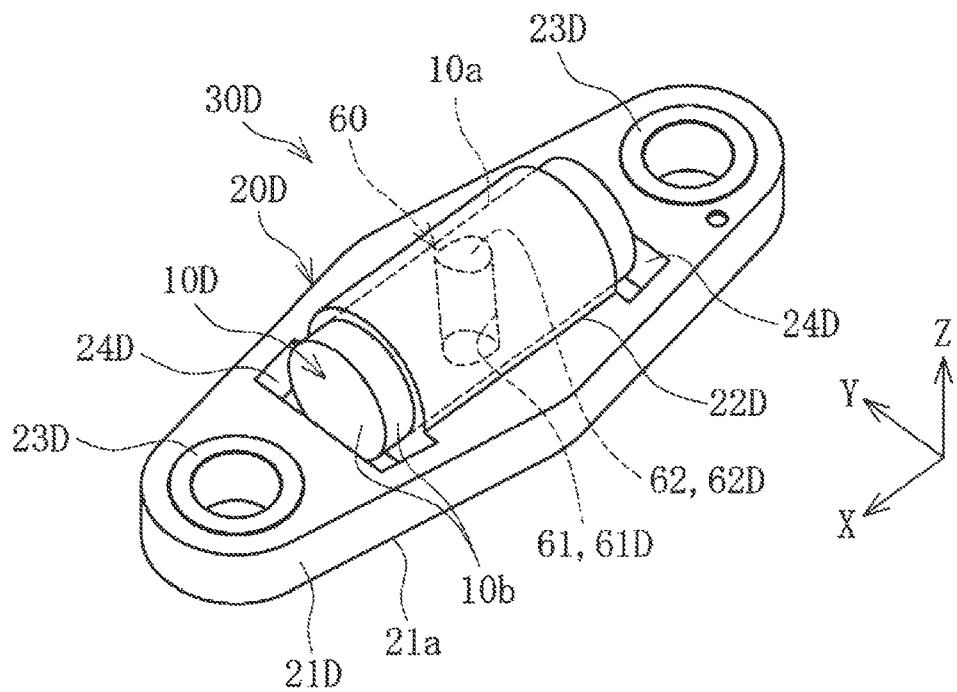
Figure 6B:
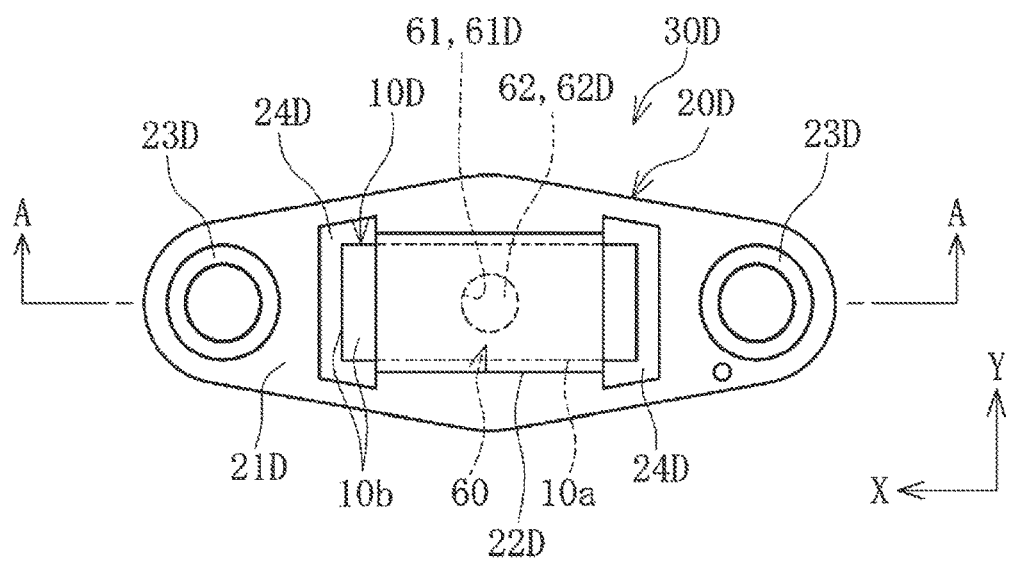
Figure 6C:
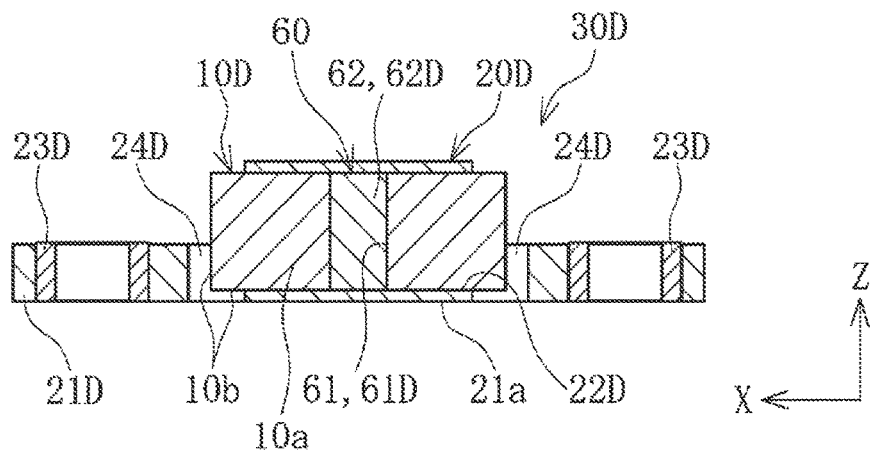

Next, a magnet unit 30D is described with reference to FIG. 6.

Figure 5A:
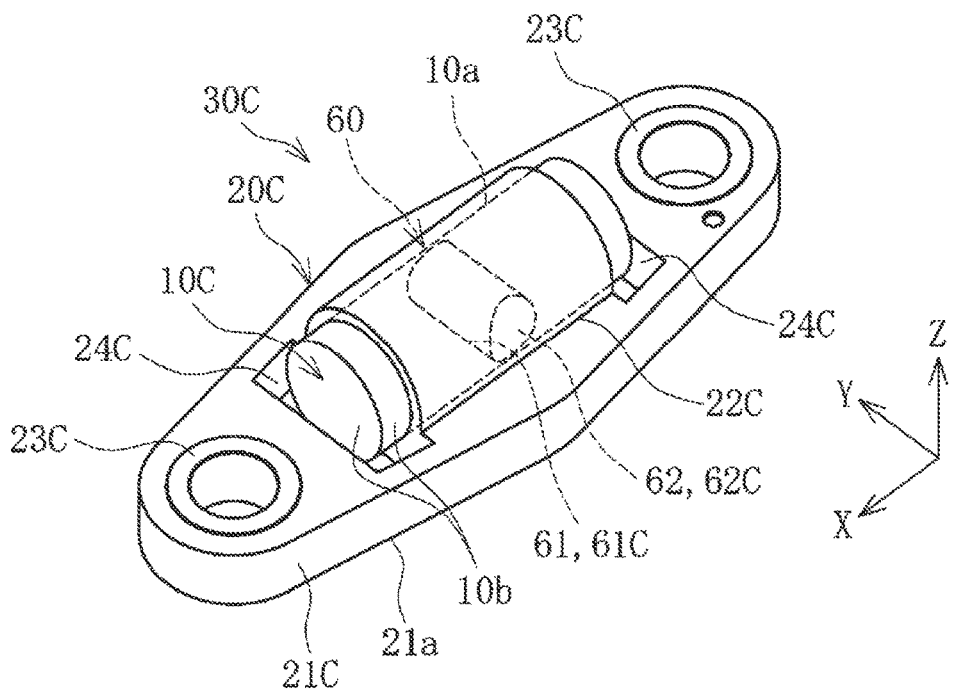
Figure 5B:
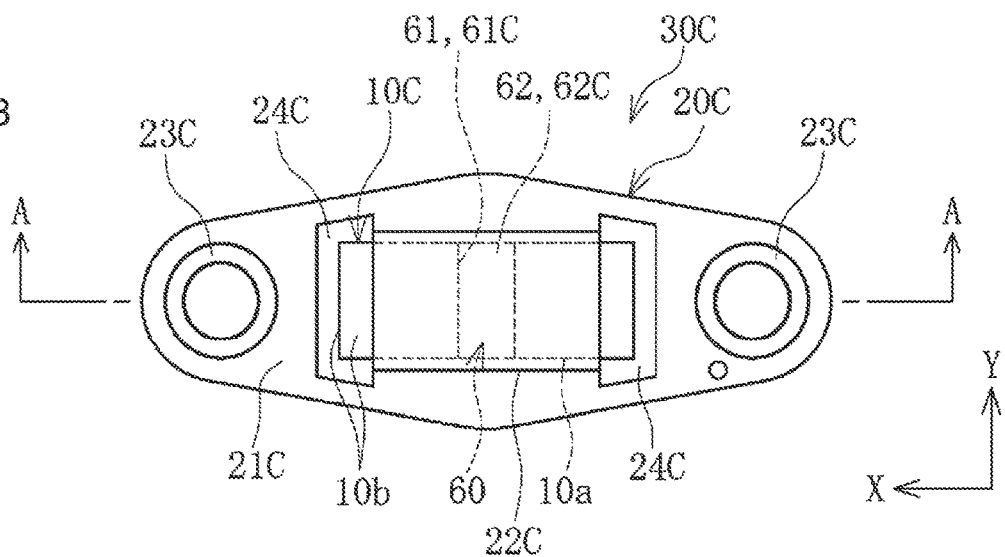
Figure 5C:
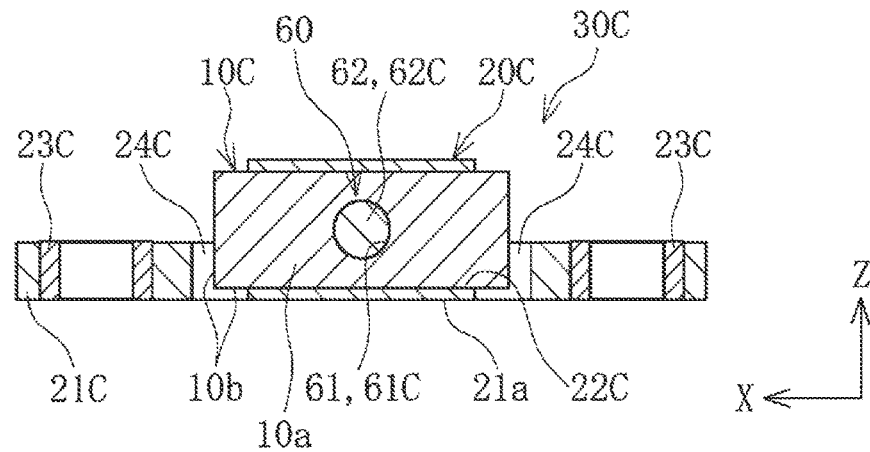

The magnet unit 30D differs from the magnet unit 30C described in FIG. 5 in the configuration of a positioning portion 60 that regulates a position of a magnet 10D with respect to a magnet holding member 20D and mounts the magnet 10D thereto. Similarly to the magnet unit 30C, the magnet unit 30D includes the positioning portion 60 formed by fitting and positioning a concave portion 61 and a convex portion 62 with each other between an outer portion 10a of the magnet 10D and a magnet housing part 22D of the magnet holding member 20D. In the positioning portion 60, the concave portion 61 is formed in the magnet 10D in the up-down direction (Z direction), and the convex portion 62 that fits into the concave portion 61 is formed on the magnet holding member 20D in the up-down direction (Z direction), whereby the magnet unit 30D is formed. Note that, in the positioning portion 60, the concave portion 61 and the convex portion 62 may be formed on opposite sides for fitting with each other.

In the positioning portion 60, for example, the concave portion 61 is disposed in the up-down direction at a central portion of the magnet 10D in the longitudinal direction, and the convex portion 62 is disposed in the up-down direction at a central portion of the magnet housing part 22D of the magnet holding member 20D in the longitudinal direction. The magnet holding member 20D has a fixed part 21D, and a collar 23D is embedded in both ends.

In the magnet unit 30D, the concave portion 61 at a central portion of the magnet 10D is formed in the up-down direction as, for example, a cylindrical columnar concave portion 61D passing through the magnet 10D radially from the outer portion 10a. The convex portion 62 of the magnet holding member 20D is formed in the up-down direction as, for example, a cylindrical columnar convex portion 62D protruding from an inner peripheral surface of the magnet housing part 22D. Thus, a position of the magnet 10D in the longitudinal direction (X direction) and a direction (Y direction) orthogonal thereto is regulated, and the magnet 10D is positioned by fitting, into the cylindrical columnar concave portion 61D having a cylindrical through-hole of the magnet 10D, the cylindrical columnar convex portion 62D protruding in the up-down direction from the inner peripheral surface of the magnet housing part 22D of the magnet holding member 20D. Further, in the magnet unit 30D, it is also possible to regulate a position in a direction other than the central axis direction (Z direction) of columns of the columnar concave portion 61D and the columnar convex portion 62D. For example, it is possible to regulate a position in a direction (direction other than the central axis direction) intersecting the central axis direction (Z direction) of the columnar concave portion 61D.

In the magnet unit 30D, a size of the columnar concave portion 61D and the columnar convex portion 62D of the positioning portion 60, specifically, diameters of the columns, may be set to any value, as far as it is possible to position the magnet 10D in the magnet housing part 22D. It is preferable to form a uniform magnetic field as much as possible, while suppressing an effect of the magnet 10D on a magnetic field. Also, after the magnet 10D is magnetized, an effect on a detected position due to a change in a magnetic field for forming the positioning portion 60 is adjusted by performing calibration.

In the magnet unit 30D as described above, the concave portion 61 or the convex portion 62 is formed in advance on the magnet 10D. Thereafter, the magnet 10D and the collar 23D are insert-molded and fixed in the magnet housing part 22D of the magnet holding member 20D. Specifically, the magnet 10D is fixed to the magnet housing part 22D of the magnet holding member 20D by the columnar concave portion 61D and the columnar convex portion 62D of the positioning portion 60 by pouring a resin material into a die in a state that the magnet 10D is placed in the die and held by a holding pin or the like, and curing the resin material. Thereafter, the magnet 10D is magnetized, and the magnet unit 30D is obtained.

In the magnet unit 30D as described above, when a thermal expansion difference due to a temperature change or the like occurs between the magnet 10D and the magnet housing part 22D, since positions of central portions of the magnet 10D and the magnet housing part 22D are regulated by the positioning portion 60, the magnet 10D expands from the central portion of the magnet 10D toward an end surface portion 10b outwardly in the longitudinal direction (X direction). However, an opening 24D suppresses stress from being applied to the magnet housing part 22D, and prevents occurrence of a crack and a damage, thereby providing excellent thermal shock resistance. Also, by forming the positioning portion 60 by the columnar concave portion 61D and the columnar convex portion 62D, it is possible to position the magnet 10D not only at a position in the longitudinal direction (X direction) and a direction (Y direction) orthogonal thereto, but also in a direction other than the central axis direction (up-down direction) of columns of the columnar concave portion 61C and the columnar convex portion 62C.

Note that, the columnar concave portion 61D and the columnar convex portion 62D may be formed at a plurality of positions, in place of being formed at one position. Also, the columnar concave portion 61D and the columnar convex portion 62D may be formed at one or more positions without passing through the magnet 10D. In this case, it is preferable to form an opposite side (+Z direction side) of the magnet unit 30D facing the magnetic detection portion 40 of the magnetic detection section 41 into a uniform surface. This enables forming a magnetic field by the magnet 10D of the magnet unit 30D uniformly on the opposite side.

In each of the above-described embodiments, a case where the magnets 10, and 10A to 10D have a cylindrical shape is described as an example. However, the embodiments are not limited to the above, and the magnets may have a rectangular parallel-piped shape, and may be mounted on the magnet holding members 20, and 20A to 20D in the longitudinal direction as the X direction. In addition, the magnetization direction is not limited to a case where the magnets are aligned along the longitudinal direction (X direction), and the magnets may be magnetized along the up-down direction (Z direction).

The shape of the openings 24, and 24A to 24D is not limited to a rectangular through-hole, but can be any shape, as far as it is possible to cope with a thermal expansion difference or the like in a temperature environment in which the magnet units 30, and 30A to 30D are used, and it is possible to form a gap in which the end surface portion 10b does not come into contact with the magnet housing parts 22, and 22A to 22D, and stress is not applied.

In the above-described embodiment, a case where the object L to be detected linearly moves is described as an example. Alternatively, the embodiment may be applied to position detection in a case where the object L to be detected moves rotatably around a central axis, and a position may be detected by detecting a change in a magnetic field accompanied by rotational movement of the magnets 10, and 10A to 10D. In this case, it is preferable to form an opposite side (+Z direction side) of the magnet units 30, and 30A to 30D facing the magnetic detection portion 40 of the magnetic detection section 41 into a uniform surface, and to use a cylindrical magnet or a magnet whose upper surface has a curved surface protruding toward the opposite side.

Further, the embodiment can also be applied to a case where not only one of linear movement and rotational movement of the object L to be detected, but also both of linear movement and rotational movement are detected.

Next, an embodiment of the position detection device 1 is described with reference to the drawings.

The position detection device 1 according to the present invention includes the magnet unit 30, the magnetic detection portion 40 having the magnetic detection element (magnetic detection section) 41 facing the magnet unit 30, and the case 50 in which the magnetic detection portion 40 is housed.

The position detection device 1 includes the magnet unit 30 (30A to 30D) that has already been described, and detects a position by detecting a change in a magnetic field caused by relative movement of the magnet 10 (10A to 10D) by the magnetic detection portion 40 having the magnetic detection element (magnetic detection section) 41.

In the following description, a case where the magnet unit 30 is used is described as an example.

In the position detection device 1, as shown in FIGS. 1 and 7, for example, the magnet unit 30 is fixed to the cutout portion La of the object L to be detected, and is moved linearly, and the case 50 is fixed to the magnet unit 30 in an apparatus or the like, and a change in a magnetic field accompanied by relative movement of the magnet 10 of the magnet unit 30 is detected by the magnetic detection element 41 of the magnetic detection portion 40 for position detection.

The magnetic detection portion 40 is electrically connected to the magnetic detection element 41 by mounting an electronic component (not shown) on a circuit board 42. The magnetic detection element 41 is constituted of a Hall IC or the like that detects a change in a magnetic field accompanied by movement of the object L to be detected. The electronic component is constituted of components such as an IC chip that processes an output signal of the magnetic detection element 41, a capacitor that constitutes a protection circuit, and the like.

The magnetic detection element 41 and the electronic component are mounted at a substantially central portion on a surface of the circuit board 42 in the −Z direction.

The circuit board 42 has an unillustrated wiring pattern, and electrically connects the magnetic detection element 41 and the electronic component. The wiring pattern connects the electronic component, and is constituted of four wires, for example, two wires for power supply and two wires for signal extraction from the magnetic detection portion 40. The circuit board 42 is housed in a main body case 51 constituting the case 50 (see FIG. 1).

A wiring pattern of the circuit board 42 is connected to an unillustrated lead terminal, and the lead terminal is insert-molded and disposed within a connector case 52 that is integrally formed with the main body case 51 constituting the case 50, whereby a connection terminal for external connection is formed.

The case 50 is constituted of the main body case 51 in which the circuit board 42 is housed, and the connector case 52 in which the lead terminal is housed, and the main body case 51 and the connector case 52 are integrally formed into the single case 50.

As shown in FIG. 1, the case 50 is made of synthetic resin such as poly phenylene sulfide (PPS) resin, for example, and is formed into a substantially L-shape by integrally forming the hollow and substantially elliptical columnar connector case 52 with a step at an –X directional end of the main body case 51 of a substantially rhombus shape extending in the Y direction.

At both ends (ends in the ±Y direction) of the main body case 51, bolt insertion holes 53 for fixation are formed for fixing the magnetic detection portion 40 to the object L to be detected that moves relative to the magnetic detection portion 40, and a collar 54 made of metal is insert-molded for reinforcement.

The main body case 51 is fixed to an apparatus or the like by a bolt inserted into the collar 54 while facing the magnet unit 30 that is linearly moved while being fixed to the cutout portion La of the object L to be detected.

The connector case 52 is housed in a hollow interior with four lead terminals protruding from the connector case 52, and by being connected to an unillustrated connector, power supply from the outside and extraction of an output signal are enabled.

In the position detection device 1, for example, the case 50 of the position detection device 1 is fixed to an apparatus while straddling a shaft being the object L to be detected via the collars 54 at both ends, and the magnetic detection portion 40 is installed in such a way as to face the magnet 10 of the magnet unit 30 mounted on the object L to be detected.

Thus, relative movement of the magnet 10 of the object L to be detected is detected by the magnetic detection element 41 of the magnetic detection portion 40, and a position is detected by extracting an output signal to the outside by the connector connected to the connector case 52.

Note that, similarly to the case of the magnet unit 30, the above-described embodiment has been described by using, as an example, a case where the object L to be detected moves linearly. However, the embodiment is also applicable to position detection in a case where the object L to be detected moves rotatably around the central axis, and a position may be detected by detecting a change in a magnetic field accompanied by rotational movement of the magnets 10, and 10A to 10D. In this case, it is preferable to form an opposite side (+Z direction side) of the magnet units 30 and, 30A to 30D facing the magnetic detection portion 40 of the magnetic detection section 41 into a uniform surface, and to use a cylindrical magnet or a magnet whose upper surface has a curved surface protruding toward the opposite side.

Further, the embodiment is also applicable to a case where not only one of linear movement and rotational movement of the object L to be detected but also both of linear movement and rotational movement are detected. In this case, in addition to the magnetic detection element 41 that detects a linear change in a magnetic field, a magnetic detection element (not shown) that detects a change in a magnetic field in a rotational direction is provided on the circuit board 42. The magnetic detection element that detects a change in a magnetic field in a rotational direction can be provided in the same IC package as the magnetic detection element 41.

The position detection device 1 as described above includes: a magnet unit 30 including the magnet 10 that moves linearly or rotatably with respect to the magnetic detection element (magnetic detection section) 41 that detects a change in a magnetic field and the magnet holding member 20 that moves linearly or rotatably while being fixed to the object L to be detected, and to which the magnet 10 is mounted; the magnetic detection portion 40 having the magnetic detection element 41 facing the magnet unit 30; and the case 50 in which the magnetic detection portion 40 is housed. Therefore, it is possible to detect, by the magnetic detection element 41, a change in a magnetic field accompanied by linear movement or rotational movement of the object L to be detected, and to detect a position accompanied by linear movement or a position accompanied by rotational movement. In addition, even when the position detection device 1 is used in an environment in which a temperature change is large, the magnet unit 30 prevents stress due to a thermal expansion difference between the magnet 10 and the magnet holding member 20 from acting on the magnet holding member 20, whereby a position can be detected with accuracy without the risk of occurrence of a damage such as a crack, and with excellent thermal shock resistance.

As described above specifically along with the embodiment, the magnet unit 30 includes the magnet 10 that moves linearly or rotatably with respect to the magnetic detection element (magnetic detection section) 41 that detects a change in a magnetic field, and the magnet holding member 20 that moves linearly or rotatably while being fixed to the object L to be detected, and to which the magnet 10 is mounted. The magnet holding member 20 includes the fixed part 21 fixed to the object L to be detected, and the magnet housing part 22 to which the magnet 10 is mounted, and the magnet housing part 22 has the openings 24 through which the longitudinal opposite end surface portions 10b of the magnet 10 are exposed.

In this configuration, since the magnet 10 is mounted on the magnet housing part 22 of the magnet holding member 20 in a state that the end surface portions 10b of the magnet 10 are exposed through the openings 24, even when a thermal expansion difference occurs between the magnet 10 and the magnet holding member 20, stress does not act on the magnet holding member 20, whereby the magnet unit 30 can be formed while suppressing occurrence of a damage such as a crack, with excellent thermal shock resistance. In addition, since the magnet 10 is mounted at a predetermined position of the magnet holding member 20, it is possible to detect a position with accuracy.

In the magnet unit 30, the magnet holding member 20 includes the positioning portion 60 formed by fitting and positioning the concave portion 61 and the convex portion 62 with each other between the outer portion 10a of the magnet 10 and the magnet housing part 22.

In this configuration, even when the magnet 10 is mounted on the magnet housing part 22 of the magnet holding member 20 in a state that the opposite end surface portions 10b of the magnet 10 are exposed through the openings 24, it is possible to position the magnet 10 at least in the longitudinal direction by fitting the concave portion 61 and the convex portion 62 of the positioning portion 60 with each other, whereby thermal shock resistance can be secured, and at the same time, a position can be detected with accuracy by mounting the magnet 10 at a predetermined position of the magnet holding member 20.

In the magnet unit 30, the positioning portion 60 is formed at a central portion of the magnet 10 and the magnet housing part 22 in the longitudinal direction.

In this configuration, since expansion and contraction due to a thermal expansion difference occurs toward the opposite end surface portions 10b from the central portion where the magnet 10 is positioned by the positioning portion 60, an effect of thermal expansion can be suppressed to one-half or the like, thermal shock resistance can be secured with more certainty, and at the same time, a position can be detected with accuracy.

In the magnet unit 30A, the positioning portion 60 is constituted of the annular concave portion (concave portion) 61A being at least a part of an annular portion, and the annular convex portion (convex portion) 62A being at least a part of an annular portion that fits into the annular concave portion 61A.

In this configuration, by positioning with use of the annular concave portion (concave portion) 61A and the annular convex portion (convex portion) 62A that fits into the annular concave portion 61A, it is possible to securely position the magnet 10A and the magnet holding member 20A of the magnet unit 30A, and it is possible to secure thermal shock resistance, and at the same time, it is possible to detect a position with accuracy by the positioned magnet 10A. Also, constituting the annular concave portion (concave portion) 61A and the annular convex portion (convex portion) 62A that fits into the annular concave portion 61A by a part of an annular portion, in place of forming the annular concave portion (concave portion) 61A and the annular convex portion (convex portion) 62A into an annular shape enables positioning around a rotation axis between the magnet 10A and the magnet holding member 20A, whereby positioning can be performed with more accuracy.

In the magnet unit 30B, the positioning portion 60 is constituted of the D-shaped concave portion (concave portion having a first planar portion) 61B and the D-shaped convex portion (convex portion having a second planar portion in contact with the first planar portion) 62B formed on at least one side of the outer portion 10a of the magnet 10B and the magnet housing part 22B with respect to the longitudinal direction.

In this configuration, it is possible to securely position the magnet 10B and the magnet holding member 20B of the magnet unit 30B, and it is possible to secure thermal shock resistance, and at the same time, it is possible to detect a position with accuracy by the positioned magnet 10B. Also, the D-shaped concave portion 61B and the D-shaped convex portion 62B enable positioning around a rotational axis between the magnet 10B and the magnet holding member 20B, whereby positioning can be performed with more accuracy.

In the magnet unit 30C, the positioning portion 60 is constituted of the columnar concave portion (columnar concave portion) 61C and the columnar convex portion (columnar convex portion) 62C that fits into the columnar concave portion 61C.

In this configuration, it is possible to position the magnet 10C and the magnet holding member 20C of the magnet unit 30C securely, and it is possible to secure thermal shock resistance, and at the same time, it is possible to detect a position with accuracy by the positioned magnet 10C. Also, the columnar concave portion 61C and the columnar convex portion 62C enable positioning around a rotation axis between the magnet 10C and the magnet holding member 20C, and it is possible to perform positioning with more accuracy. As far as it is possible to keep the concave portion 61 and the convex portion 62 of the positioning portion 60 from being located on a surface of the magnet 10C, it is possible to uniformly form a magnetic field on the surface of the magnet 10C.

Also, by forming the columnar concave portion 61C in such a way as to pass through the magnet 10C, and fitting the columnar convex portion 62C into the columnar concave portion 61C in such a way as to fill the columnar convex portion 62C, it is possible to securely position the magnet 10C and the magnet holding member 20C of the magnet unit 30C by charging resin.

This enables securing thermal shock resistance, and at the same time, detecting a position with accuracy by the positioned magnet 10C.

In the magnet unit 30D, the positioning portion 60 is constituted of the columnar concave portion (columnar concave portion) 61D in the up-down direction and the columnar convex portion (columnar convex portion) 62D that fits into the columnar concave portion 61D in the up-down direction.

In this configuration, it is possible to securely position the magnet 10D and the magnet holding member 20D of the magnet unit 30D, and it is possible to secure thermal shock resistance, and at the same time, it is possible to detect a position with accuracy by the positioned magnet 10D. In addition, the columnar concave portion 61D and the columnar convex portion 62D enable positioning around a rotation axis between the magnet 10D and the magnet holding member 20D, and positioning can be performed with more accuracy. As far as it is possible to keep the concave portion 61 and the convex portion 62 of the positioning portion 60 from being located on a surface of the magnet 10D, it is possible to uniformly form a magnetic field on the surface of the magnet 10D.

Also, by forming the columnar concave portion 61D in such a way as to pass through the magnet 10D in the up-down direction, and by fitting the columnar convex portion 62D into the columnar concave portion 61D in such a way as to fill the columnar convex portion 62D, it is possible to position the magnet 10D and the magnet holding member 20D of the magnet unit 30D securely by charging resin.

This enables securing thermal shock resistance, and at the same time, detecting a position with accuracy by the positioned magnet 10D.

The position detection device 1 includes: the magnet unit 30 provided with the magnet 10 that moves linearly or rotatably with respect to the magnetic detection element (magnetic detection section) 41 that detects a change in a magnetic field, and the magnet holding member 20 that moves linearly or rotatably while being fixed to the object L to be detected, and to which the magnet 10 is mounted; the magnetic detection portion 40 having the magnetic detection element 41 that faces the magnet unit 30; and the case 50 in which the magnetic detection portion 40 is housed.

In this configuration, the magnetic detection element 41 can detect a change in a magnetic field accompanied by linear movement or rotational movement of the object L to be detected, and can detect a position accompanied by linear movement or a position accompanied by rotational movement. In addition, even when the position detection device 1 is used in an environment in which a temperature change is large, the magnet unit 30 prevents stress due to a thermal expansion difference between the magnet 10 and the magnet holding member 20 from acting on the magnet holding member 20, whereby it is possible to detect a position with accuracy without the risk of occurrence of a damage such as a crack, and with excellent thermal shock resistance.

In the above-described embodiment, a case where detecting a position of a shift lever of an automatic transmission as the object L to be detected is performed is described as an example. The embodiment is not limited to the above, and the embodiment can be applied to position detection of the object L to be detected that moves linearly or rotatably.

Also, the present invention can be achieved by a configuration described in each of the embodiments alone or in combination.

In addition, the present invention is not limited to the above-described embodiment. For example, materials for a magnet, a magnet holding member, a case, and the like are not limited to those in the foregoing description, and can be modified into those having the same function. The magnetic detection element is not limited to a Hall IC, and other elements can also be used.

DESCRIPTION OF REFERENCE NUMERALS

1 Position detection device
10 Magnet
10A Magnet
10B Magnet
10C Magnet
10D Magnet
10a Outer portion
10b End surface portion
20 Magnet holding member
20A Magnet holding member
20B Magnet holding member
20C Magnet holding member
20D Magnet holding member
21 Fixed part
21A Fixed part
21B Fixed part
21C Fixed part
21D Fixed part
21a Bottom surface portion
22 Magnet housing part
22A Magnet housing part
22B Magnet housing part
22C Magnet housing part
22D Magnet housing part
23 Collar
23A Collar
23B Collar
23C Collar
23D Collar
24 Opening
24A Opening
24B Opening
24C Opening
24D Opening
30 Magnet unit
30A Magnet unit
30B Magnet unit
30C Magnet unit
30D Magnet unit
40 Magnetic detection portion
41 Magnetic detection element (magnetic detection section)
42 Circuit board
50 Case
51 Main body case
52 Connector case
53 Bolt insertion hole
54 Collar
60 Positioning portion
61 Concave portion
61A Annular concave portion
61B D-shaped concave portion
61C Columnar concave portion
61D Columnar concave portion
62 Convex portion
62A Annular convex portion
62B D-shaped convex portion
62C Columnar convex portion
62D Columnar convex portion
L Object to be detected
La Cutout portion

The invention claimed is:

1. A magnet unit comprising:
a magnet that moves linearly or rotatably with respect to a magnetic detection section that detects a change in a magnetic field; and
a magnet holding member that moves linearly or rotatably while being fixed to an object to be detected, and to which the magnet is mounted, wherein
the magnet holding member includes
a fixed part to be fixed to the object to be detected, and
a magnet housing part to which the magnet is mounted,
the magnet housing part has a pair of openings that expose both end surfaces of the magnet, and
the magnet housing part covers an entire outer portion of the magnet and exposes a part of the outer portion adjacent to the end surface.

2. The magnet unit according to claim 1, wherein
the magnet holding member includes a positioning portion formed by fitting and positioning a concave portion and a convex portion with each other between an outer portion of the magnet and the magnet housing part.

3. The magnet unit according to claim 2, wherein
the positioning portion is formed at a central portion of the magnet and the magnet housing part in a longitudinal direction.

4. The magnet unit according to claim 2, wherein
the positioning portion is constituted of the concave portion being at least a part of an annular portion, and the convex portion being at least a part of an annular portion and which fits into the concave portion.

5. The magnet unit according to claim 2, wherein
the positioning portion is constituted of the concave portion having a first planar portion, and the convex portion having a second planar portion in contact with the first planar portion, the first planar portion being formed on at least one side of an outer portion of the magnet and the magnet housing part with respect to a longitudinal direction.

6. The magnet unit according to claim 2, wherein
the positioning portion is constituted of the concave portion, which is columnar, and the convex portion, which is columnar, the columnar convex portion fitting into the columnar concave portion.

7. The magnet unit according to claim 6, wherein
the positioning portion is constituted of the columnar concave portion passing therethrough, and the columnar convex portion passing therethrough.

8. A position detection device comprising:
the magnet unit according to claim 1 including
a magnet that moves linearly or rotatably with respect to magnetic detection section that detects a change in a magnetic field, and
a magnet holding member that moves linearly or rotatably while being fixed to an object to be detected, and to which the magnet is mounted;
a magnetic detection portion including the magnetic detection section facing the magnet unit; and
a case in which the magnetic detection portion is housed.

* * * * *